(12) United States Patent
Omari

(10) Patent No.: US 12,151,769 B2
(45) Date of Patent: Nov. 26, 2024

(54) SELF-SUPPORTING FOLDING SCOOTER

(71) Applicant: Muhr und Bender KG, Attendorn (DE)

(72) Inventor: Ahmad Omari, Aachen (DE)

(73) Assignee: MUHR UND BENDER KG, Attendorn (DE)

( * ) Notice: Subject to any disclaimer, the term of this patent is extended or adjusted under 35 U.S.C. 154(b) by 59 days.

(21) Appl. No.: 17/765,457

(22) PCT Filed: Oct. 1, 2020

(86) PCT No.: PCT/DE2020/000232
§ 371 (c)(1),
(2) Date: Mar. 31, 2022

(87) PCT Pub. No.: WO2021/063433
PCT Pub. Date: Apr. 8, 2021

(65) Prior Publication Data
US 2022/0379991 A1      Dec. 1, 2022

(30) Foreign Application Priority Data

Oct. 2, 2019   (DE) .................... 10 2019 006 930.7

(51) Int. Cl.
*B62K 15/00*      (2006.01)
*B62K 5/00*       (2013.01)
(Continued)

(52) U.S. Cl.
CPC .............. *B62K 15/008* (2013.01); *B62K 5/08* (2013.01); *B62K 25/12* (2013.01); *B62K 2005/001* (2013.01)

(58) Field of Classification Search
CPC ...... B62K 3/002; B62K 15/006; B62K 15/00; B62K 5/06; B62K 15/008; B62K 7/04; B62K 2005/001; B60Y 2200/126
(Continued)

(56) References Cited

U.S. PATENT DOCUMENTS

| 8,631,892 | B2 * | 1/2014 | Constin | B62K 3/002 180/208 |
| 9,493,206 | B1 * | 11/2016 | Oh | B62K 3/002 |
| 2018/0338877 | A1 * | 11/2018 | Kano | B62K 15/00 |

FOREIGN PATENT DOCUMENTS

| CN | 104787197 A | 7/2015 |
| CN | 108082372 A | 5/2018 |

(Continued)

OTHER PUBLICATIONS

International Search Report and Written Opinion for PCT/DE2020/000232 mailed Jan. 12, 2021 (10 pages; with English translation of International Search Report).

*Primary Examiner* — Amy R Weisberg
*Assistant Examiner* — Caitlin Anne Miller
(74) *Attorney, Agent, or Firm* — Bejin Bieneman PLC

(57) ABSTRACT

A foldable self-supporting scooter comprises at least three wheels, a steering column, a footboard, a front axle for receiving at least one front wheel, a rear suspension for receiving at least one rear wheel, and a folding mechanism that autonomously folds the scooter, wherein a synchronization rod provides that the center of gravity of the scooter remains between the front and rear wheels at all times during the folding operation, without the need for the scooter to be held by the user and without tipping over.

12 Claims, 3 Drawing Sheets

(51) Int. Cl.
*B62K 5/08* (2006.01)
*B62K 25/12* (2006.01)

(58) Field of Classification Search
USPC .............................. 180/208, 214; 280/87.041
See application file for complete search history.

(56) References Cited

FOREIGN PATENT DOCUMENTS

| | | | | |
|---|---|---|---|---|
| DE | 10204478 A1 | * | 8/2003 | ................ B62J 7/06 |
| DE | 102011106561 B4 | | 4/2013 | |
| EP | 2174860 A1 | | 4/2010 | |
| FR | 2821331 A1 | | 8/2002 | |
| JP | 2017140916 A | | 8/2017 | |
| JP | 2018024386 A | | 2/2018 | |
| WO | WO-03055737 A1 | * | 7/2003 | ........... B62K 15/008 |
| WO | 2016176124 A1 | | 11/2016 | |
| WO | 2018008869 A1 | | 1/2018 | |

\* cited by examiner

SELF-SUPPORTING FOLDING SCOOTER

CROSS-REFERENCE TO RELATED APPLICATIONS

This application is a national stage of, and claims priority to, Patent Cooperation Treaty Application No. PCT/DE2020/000232, filed on Oct. 1, 2020, which application claims priority to German Application No. DE 10 2019 006 930.7, filed on Oct. 2, 2019, which applications are hereby incorporated herein by reference in their entireties.

BACKGROUND

In the state of the art, simple folding mechanisms are used that cannot provide independent standing of the scooter when folded. Thus, conventional foldable scooters must lie on the ground or lean against an object when folded. Another disadvantage of conventional folding mechanisms is that when a trolley function is applied in the folded state, the rear wheel with road debris is directly in the area of the handlebar or the handle—see e.g. DE 102011106561 B4 or EP 2174860 A1. Other disclosures, such as WO 2016/176124 A1, WO 2018/008869 A1 or FR 2821331 A1 solve the described problem with a folding mechanism whose essential component is a sliding element. The latter is disadvantageous since sliding elements are more prone to dirt than hinge pins and thus are subject to higher wear. Furthermore, conventional folding mechanisms have the disadvantage that several handles are often required to fully transfer the scooter into the folded state. WO 2003/55737 A1 and CN 108082372 disclose further foldable scooters, in which folding mechanisms, however, are implemented in an elaborate manner.

DETAILED DESCRIPTION OF AN EXEMPLARY EMBODIMENT

The present disclosure relates to a foldable self-supporting scooter. Foldable scooters, whether 2-wheeled or 3-wheeled, are increasingly seen as an important component of the mobility transition. Most scooters have a folding mechanism that facilitates transportation and stowage of the scooter.

Figure 3:
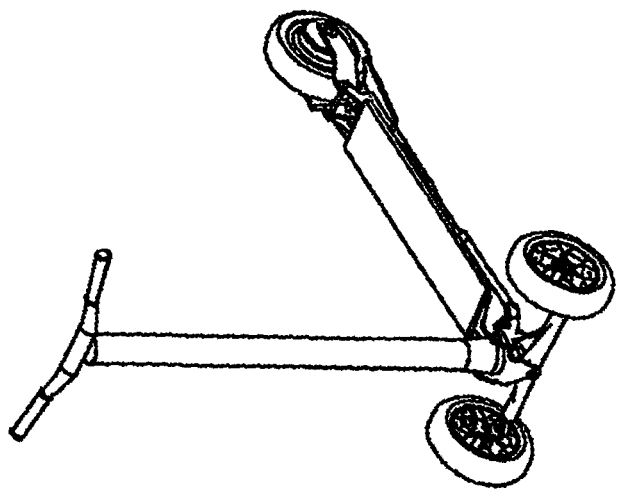
FIG. 3 shows the scooter in another folding position.
Figure 2:
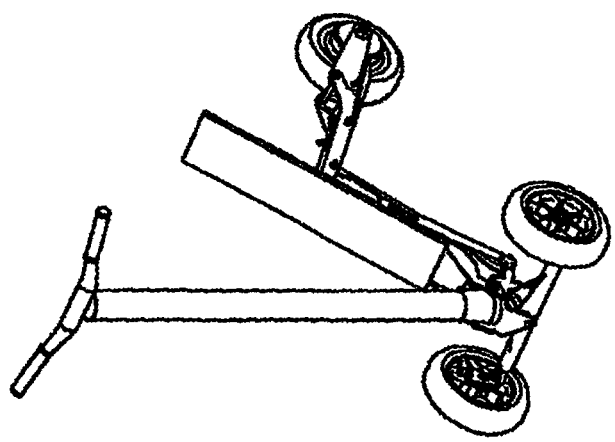
FIG. 2 shows the scooter in another folding position.
Figure 1:
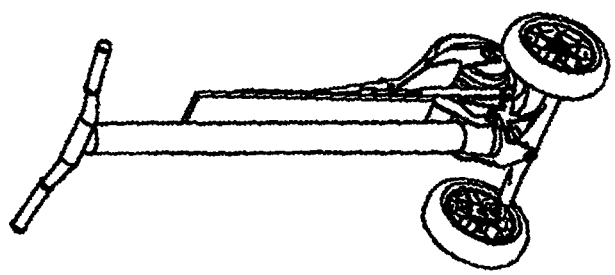
FIG. 1 shows an embodiment of a scooter in a folding position.

An at least three-wheeled scooter is described herein, with or without electric assistance, with the specific feature of an innovative folding mechanism. As shown in FIGS. 1-3, the folding mechanism allows all wheels to be in constant contact with the ground, both in the unfolded state and in the folded state, wherein the center of gravity of the scooter is located in between the wheels at all times. Thus, the scooter can stand independently in each state and in all intermediate states. This is an advantage with regard to the stowability of the scooter and enables a convenient transport, for example as a trolley.

A further special feature of the folding mechanism described herein is that its activation is realized by actuating a single lever, which can be operated with the foot. Actuation of the lever results in the unlocking of a gas spring 12 or a mechanical spring which drives the folding mechanism and, depending on the spring force, leads to complete folding of the scooter. Thus, the user does not have to bend down to the ground or complete several manipulations to fold the scooter.

Figure 4:
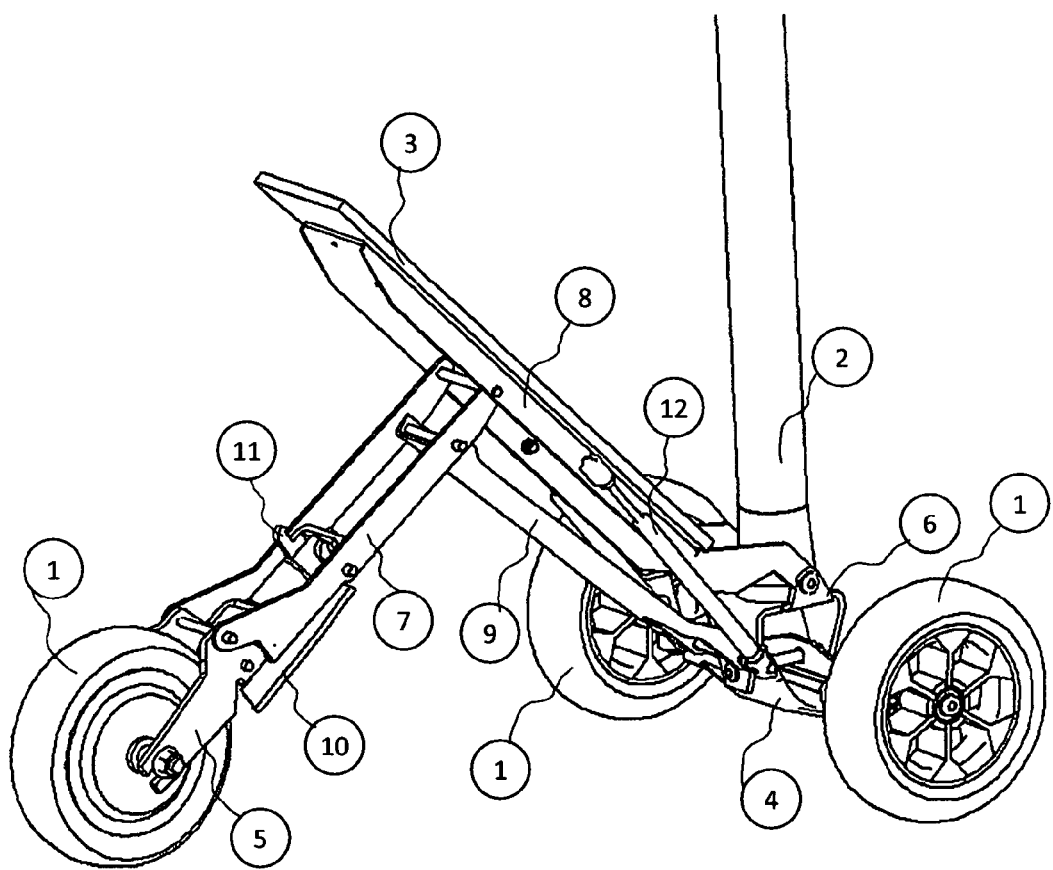
FIG. 4 illustrates a folding mechanism of the scooter.

The claimed scooter comprises the following components, as shown in FIG. 4: Three wheels 1, a steering column 2 at the front of the scooter, a footboard 3, a front axle 4 for receiving the front wheels, a rear suspension 5 for receiving the rear wheel, a folding mechanism, the latter consisting of a front axle suspension 6 providing a device for receiving the steering column 2 and for receiving the front axle 4, a sub-base 7 to which the rear suspension 5 is attached, a main base 8, a synchronizing rod 9, an actuating lever 10 for initiating the folding operation, and a spring-loaded latching plate 11 for securing the maintenance of the unfolded and/or the folded state.

The main base 8 is connected to the front axle suspension 6 by means of a hinge pin. The sub-base 7 is connected to the main base 8 by means of a hinge pin, and the synchronizing rod 9 is connected to the front axle suspension 6 and to the sub-base 7 at respective ends by hinge pins or hinge connectors. The synchronizing rod 9 provides that the center of gravity of the scooter remains between the front and rear wheels at all times during the folding operation.

Additionally, said folding mechanism includes one or more gas springs 12 biased between the main base 8 and the front axle suspension 6. Alternatively, the gas spring 12 can also be preloaded between the front axle suspension 6 and the sub-base 7. The gas spring 12 is used to drive the folding mechanism. Together with the synchronizing rod 9, this enables the scooter to fold autonomously without the user having to hold the scooter and without the scooter tipping over in the process.

The footboard 3 is the surface on which the user stands while riding. In this example, the footboard 3 is firmly connected to the main base 8, both thus forming a unitary part. An alternative is to connect the footboard 3 to the sub-base 7 only.

When unfolded, the main base 8 and the sub-base 7 are locked together by means of the latching plate 11. The lock and the hinge connection provide a firm connection between the main base 8 and the sub-base 7. This is necessary to prevent the folding mechanism from folding uncontrollably into the unfolded state during travel, for example when driving over obstacles or due to unevenness in the road surface.

When the actuating lever 10 is pressed, for example with the foot, the latching plate 11 is released from the main base 8. Thereupon, the gas springs 12 can fold the folding mechanism by pushing the main base 8 upwards. The synchronizing rod 9 thereby pulls the sub-base 7 together with the rear suspension 5 and rear wheel towards the front suspension 6, or alternatively the front suspension 6 towards the rear suspension 5. Thus, the scooter is autonomously conveyed from the unfolded state to the folded state, wherein the center of gravity of the scooter remains in between the wheels and prevents the scooter from tipping over at all times during folding.

Further, the spring-loaded latching plate 11 acts as a securing mechanism in both the unfolded state and the folded state, providing that the folding mechanism can only change state when the user presses the actuating lever 10. The latching plate 11 is attached to the sub-base 7 by means of a hinge pin and is spring-loaded in such a way that pressing the actuating lever 10 rotates the latching plate 11.

Figure 5:
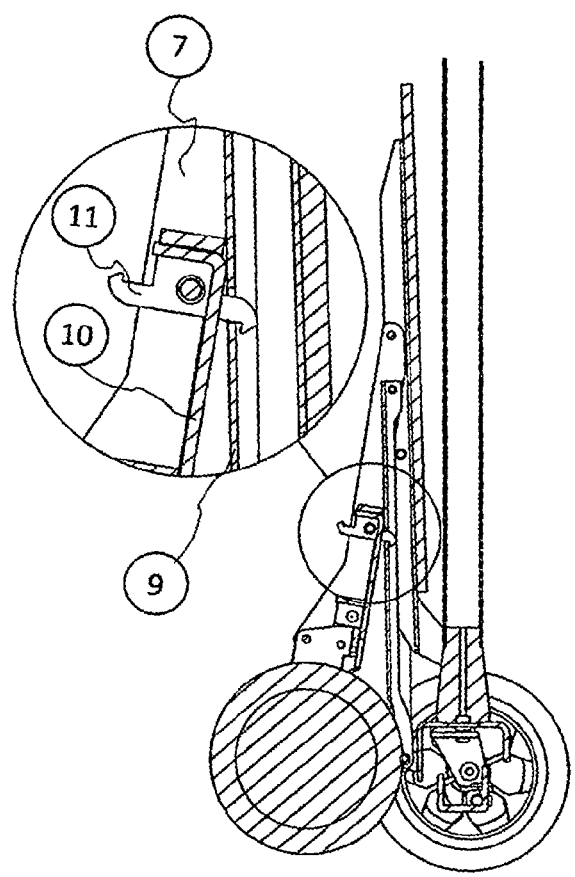
FIG. 5 shows a detail of the folding mechanism.

The securing of the folded state is realized by the spring-loaded engagement of the latching plate 11 to the synchronizing rod 9—see FIG. 5. The securing of the unfolded state is realized by the spring-loaded engagement of the latching plate 11 to the main base 8. The unlocking of those states is triggered by the actuating lever 10, which rotates the latching plate 11 against its spring loading and thus releases the engagement of the latching plate 11 from the main base 8 and/or from the synchronizing rod 9.

As an example, a scooter with two front wheels and one rear wheel has been described here. However, the folding mechanism is not limited to this configuration and can also be applied to scooters and/or vehicles with one front wheel and two rear wheels, or with two front wheels and two rear wheels.

The invention claimed is:

1. A foldable self-supporting scooter, comprising:
   at least three wheels,
   a steering column,
   a footboard,
   a front axle for receiving at least one front wheel,
   a rear suspension for receiving at least one rear wheel, and
   a folding mechanism, the folding mechanism comprising
   a front axle suspension, which provides a device for receiving the steering column and for receiving the front axle,
   a sub-base to which the rear wheel suspension is attached,
   a main base,
   a synchronizing rod,
   an actuating lever for initiating a folding operation,
   a latching plate for securing the scooter in at least one of an unfolded state and a folded state,
   wherein the main base is connected to the front axle suspension by a first hinge pin, the sub-base is connected to the main base by a second hinge pin, the synchronizing rod is connected to the front axle suspension and to the sub-base at respective ends by third hinge pins, and the latching plate is mounted on the sub-base by a fourth hinge pin,
   wherein the synchronizing rod is configured to keep a center of gravity of the scooter in a position between the at least one front wheel and the at least one rear wheel at all times during the folding operation,
   wherein, after unlocking the folding mechanism, the scooter autonomously passes from the unfolded state to the folded state, without the scooter needing to be held by a user and without tipping over,
   wherein one of the sub-base and the main base is connected to the front axle suspension by at least one spring to facilitate the folding operation of the scooter, and
   wherein the latching plate is spring-loaded and is rotatable by the actuating lever against the spring loading thereof, in such a manner that the latching plate in the folded state engages in the synchronizing rod to secure the maintenance of the folded state and in the unfolded state engages in the main base to secure the maintenance of the unfolded state, wherein by pressing the actuating lever each of the secured folded state and unfolded state are releasable.

2. The scooter according to claim 1, wherein the folding mechanism is unlocked upon actuation of the actuating lever.

3. The scooter according to claim 1, wherein the footboard is fixedly connected to either one of the sub-base and the main base, thus forming a unitary part, respectively.

4. The scooter according to claim 1, wherein the scooter is foldable without the footboard folding or splitting in the folding operation, a constant contact with the ground of the at least three wheels being provided, and, in the folded state, a wheelbase of the scooter being reduced.

5. The scooter according to claim 1, wherein the main base and the sub-base, in addition to the second hinge pin, are further firmly connectable to each other by a latching mechanism to prevent the scooter from folding in an uncontrolled manner.

6. The scooter according to claim 1, wherein the at least one front wheel is attached to the front axle suspension by at least one of a rocker axle and a device for steering the wheels.

7. The scooter according to claim 1, further comprising a securing mechanism that maintains at least one of the folded state and the unfolded state and allows a change of state only when intended by the user.

8. The scooter according to claim 1, wherein at least one of the at least three wheels is motorized.

9. The scooter according to claim 1, wherein the at least one spring is a gas spring or a mechanical spring.

10. A foldable self-supporting scooter, comprising
    at least three wheels,
    a steering column,
    a footboard,
    a front axle for receiving at least one front wheel,
    a rear suspension for receiving at least one rear wheel, and
    a folding mechanism, the folding mechanism comprising
    a front axle suspension, which provides a device for receiving the steering column and for receiving the front axle,
    a sub-base to which the rear wheel suspension is attached,
    a main base,
    a synchronizing rod,
    an actuating lever for initiating a folding operation,
    a latching plate for securing the scooter in at least one of an unfolded state and a folded state, wherein after unlocking the folding mechanism by the actuating lever, the scooter autonomously passes from the unfolded state to the folded state, without the scooter needing to be held by a user and without tipping over, wherein by pressing the actuating lever each of the folded state and unfolded state secured by the latching plate are releasable,
    wherein the main base is connected to the front axle suspension by a first hinge pin, the sub-base is connected to the main base by a second hinge pin, the synchronizing rod is connected to the front axle suspension and to the sub-base at respective ends by third hinge pins, wherein the synchronizing rod is configured to keep a center of gravity of the scooter in a position between the at least one front wheel and the at least one rear wheel at all times during the folding operation,
    wherein during the folding operation the synchronizing rod provides that the main base folds relative to the front axle suspension about the first hinge pin and synchronously the sub-base folds relative to the main base about the second hinge pin and the steering column remains within a 15° cone around a vertical direction,
    wherein one of the sub-base and the main base is connected to the front axle suspension by at least one spring to facilitate the folding operation of the scooter, and
    wherein the folding mechanism is unlocked upon actuation of the actuating lever.

11. A foldable self-supporting scooter, comprising
at least three wheels,
a steering column,
a footboard,
a front axle for receiving at least one front wheel,
a rear suspension for receiving at least one rear wheel, and
a folding mechanism, the folding mechanism comprising
a front axle suspension, which provides a device for receiving the steering column and for receiving the front axle,
a sub-base to which the rear wheel suspension is attached,
a main base,
a synchronizing rod,
an actuating lever for initiating a folding operation,
a latching plate for securing the scooter in at least one of an unfolded state and a folded state,
wherein the main base is connected to the front axle suspension by a first hinge pin, the sub-base is connected to the main base by a second hinge pin, the synchronizing rod is connected to the front axle suspension and to the sub-base at respective ends by third hinge pins, wherein the synchronizing rod is configured to keep a center of gravity of the scooter in a position between the at least one front wheel and the at least one rear wheel at all times during the folding operation,
wherein one of the sub-base and the main base is connected to the front axle suspension by at least one spring to facilitate the folding operation of the scooter,
wherein the folding mechanism is unlocked upon actuation of the actuating lever, and
wherein the latching plate is mounted on the sub-base by a fourth hinge pin, is spring-loaded and is rotatable by the actuating lever against the spring loading thereof, in such a manner that the latching plate in the folded state engages in the synchronizing rod to secure the maintenance of the folded state and in the unfolded state engages in the main base to secure the maintenance of the unfolded state, wherein by pressing the actuating lever each of the secured folded state and unfolded state are releasable.

12. The scooter according to claim 1, wherein during the folding operation the synchronizing rod provides that the main base folds relative to the front axle suspension about the first hinge pin and synchronously the sub-base folds relative to the main base about the second hinge pin, and the steering column remains such that the scooter is prevented from tipping over.

* * * * *